Aug. 21, 1928.

H. J. ANDERSON

PATCH VULCANIZER

Filed Feb. 7, 1927

1,681,455

Inventor
Hilton J. Anderson
By D. H. Johnson
Attorney

Patented Aug. 21, 1928.

1,681,455

UNITED STATES PATENT OFFICE.

HILTON J. ANDERSON, OF ST. PAUL, MINNESOTA.

PATCH VULCANIZER.

Application filed February 7, 1927. Serial No. 166,392.

The present invention relates to a patch vulcanizer for automobile tires.

It is necessary in vulcanizing a repair in an automobile tire casing to vulcanize the repair from the inside of the casing, and also from the outside of the casing. This is sometimes done by first placing the casing over a vulcanizer which vulcanizes the repair from the inside of the casing, and thereafter placing it in a device for vulcanizing the outside of the repair. This necessitates two complete vulcanizing operations, with the necessity for clamping the tire in each of the molds and the preliminary steps of preparing the tire for vulcanization, the heating of both sets of molds, and the moving of the casing from one mold to the other. The mounting of a tire in a mold for vulcanization is a very material part of the process of repair and, in the case of a large tire, means the expenditure of considerable time and energy which could be saved if the vulcanization could be completed in one operation. However, this is impracticable with the ordinary types of molds used, since these molds, being ordinarily of cast metal weighing sometimes as much as several hundred pounds, cannot be made sufficiently mobile to permit the using of the two in conjunction with each other.

Various spot patchers, as they are called, have been devised to be secured in place by the tire wrapping which is used about a tire when it is placed on a mold for curing an inside patch, some of these spot patchers using an electrical heating element to provide the heat of vulcanization, and others using a steam chamber. However, since the treads of tires vary in curvature with their size and, since the sides of most tires are straight at their inner edge, some of them having an inverse curve near the bead of the tire, it is necessary in order to maintain equipment for the repairing of all sizes and types of tires to provide several of such patchers for different sizes and types of tires and the different portions of the tires upon which it is necessary to make the repair. Also, in the case of electrically heated spot patchers, it may be found difficult to regulate the temperature of the device, since the heat generated may vary from day to day with differences in the current employed which may vary with the outside load on said line, resulting in an undercured or over-cured repair.

An object of the present invention is to make a flexible vulcanizer having steam passages therein which may be connected to a steam supply to be heated therefrom.

In order to attain this object, there is provided in accordance with one feature of the invention, a matrix of lead having a flexible copper tube imbedded therein and a flexible connection by means of which the copper tube may be connected to a steam line to receive steam therefrom and heat the matrix.

This and other features of the invention will be more fully brought out in the following description and the accompanying drawings, wherein.

Figure 1:
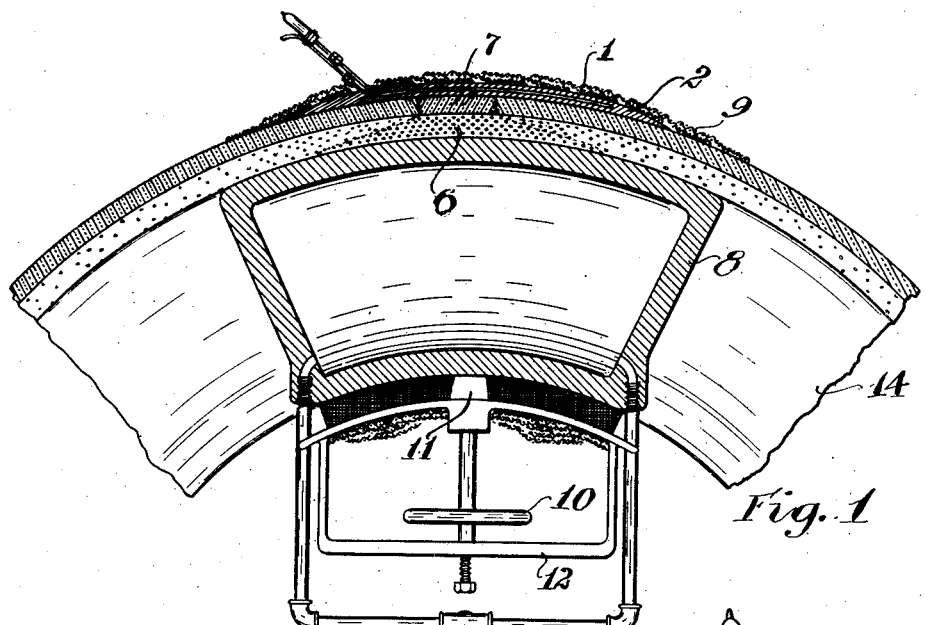
Figure 1, is a view in longitudinal section through a vulcanizer made in accordance with the present invention fixed in place on a tire casing for vulcanizing a repair therein, said tire casing being mounted upon a mold for vulcanizing an inside repair.
Figure 2:
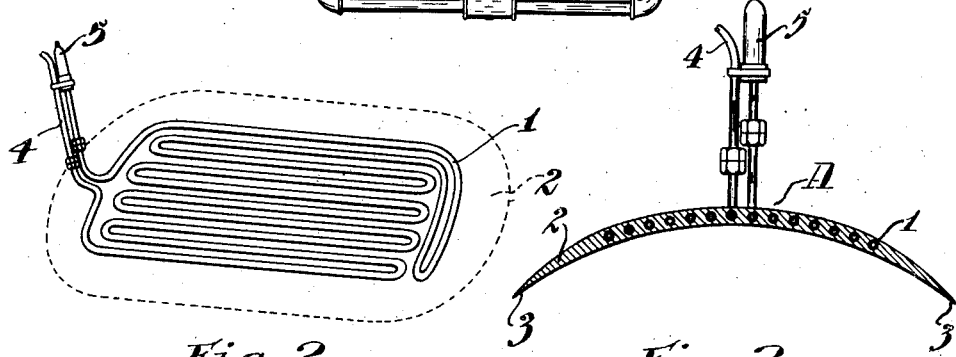
Figure 2, is a view in perspective of a copper coil which is imbedded in a lead matrix to form the vulcanizer, the position of the matrix being indicated in dotted lines.
Figure 3:
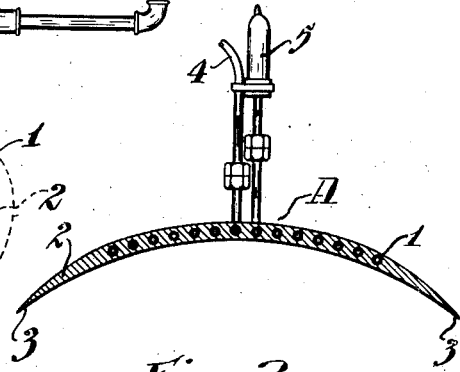
Figure 3, is a view in transverse section through the vulcanizer.
Figure 4:
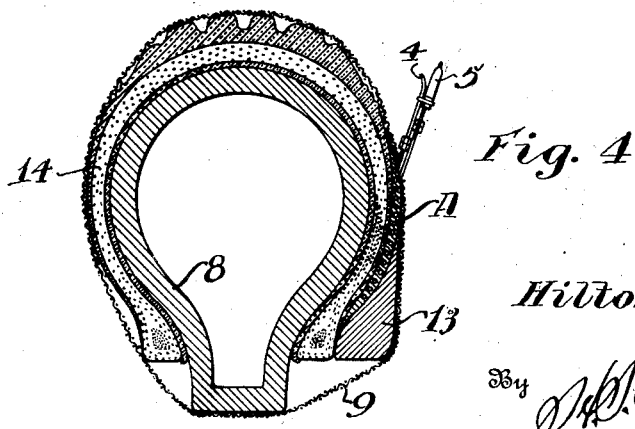
Figure 4, is a view in transverse section through a tire casing mounted upon a mold for vulcanizing inside of the casing, the vulcanizer being positioned near the inner edge of the casing to illustrate its adaptability to various degrees of curvature in the casing.

Referring to the drawings in detail, a length of copper tubing 1 is bent to form a flat coil, as shown in Figure 2, and a lead matrix 2 is molded over the tube having the edges 3 beveled to facilitate the bending of the device to conform to the curvature of a tire casing upon which it is mounted. The beveling of the edges 3 also prevents the forming of a ridge at the edge of the device when wrapped in place on a tire casing, since a sharp edge would concentrate the strain on the wrappings at this point and materially shorten the life of said wrappings. A flexible tube 4, of a type suitable to carry steam under pressure, is connected to the end of the copper coil 1, while a relief valve 5, of a suitable type, is connected to the other end of the coil 1 to regulate the flow of steam therethrough.

In using the device, a tire casing 14 is first prepared in the customary manner by placing unvulcanized rubber having fabric or cords therein in place as at 6 and a filling of unvulcanized rubber is forced into the portion of the tread which is to be replaced and the casing is then placed in position upon an inside curing mold 8, which is shaped to fit the interior of the casing. The vulcanizing unit A is then placed in position over the portion of the tread to be vulcanized and wrappings 9 of heavy canvas, or other suitable material, are wrapped spirally about the tire casing over the vulcanizing unit A to hold it securely against the tire casing. After the wrappings are in place and the free end thereof is securely fastened to prevent its unwrapping, tension is placed on the wrappings by a rotation of a wheel 10 which operates a screw 11 to force the yoke 12 downward to place the wrappings under tension. This forces the pliable vulcanizing unit A to conform with the shape of the tread, and forces it into close conjunction with the tread. In patching a casing near the bead the same procedure is followed with the exception that a bead pad 13 is used in conjunction with the wrappings to force the vulcanizing unit into intimate contact with the casing and to force the vulcanizing unit to conform with the shape thereof.

I claim:

A patch vulcanizer, comprising a flat coil of tubing imbedded in a plastic metal matrix, means for connecting one end of said tubing to a source of steam and control means associated therewith to control the flow of steam therethrough.

In testimony whereof I affix my signature.

HILTON J. ANDERSON.